United States Patent
Kuehnle et al.

(10) Patent No.: US 8,472,673 B2
(45) Date of Patent: *Jun. 25, 2013

(54) METHOD AND SYSTEM FOR REFLECTION DETECTION IN ROAD VIDEO IMAGES

(75) Inventors: Andreas Kuehnle, Villa Park, CA (US); Cathy Boon, Orange, CA (US)

(73) Assignee: Valeo Schalter und Sensoren GmbH, Bietigheim-Bissingen (DE)

(*) Notice: Subject to any disclaimer, the term of this patent is extended or adjusted under 35 U.S.C. 154(b) by 711 days.

This patent is subject to a terminal disclaimer.

(21) Appl. No.: 12/523,847

(22) PCT Filed: Jan. 23, 2008

(86) PCT No.: PCT/EP2008/000485
§ 371 (c)(1), (2), (4) Date: Oct. 6, 2009

(87) PCT Pub. No.: WO2008/089965
PCT Pub. Date: Jul. 31, 2008

(65) Prior Publication Data
US 2010/0086211 A1  Apr. 8, 2010

Related U.S. Application Data

(60) Provisional application No. 60/897,082, filed on Jan. 23, 2007, provisional application No. 60/897,225, filed on Jan. 23, 2007, provisional application No. 60/897,219, filed on Jan. 23, 2007, provisional application No. 60/897,220, filed on Jan. 23, 2007.

(51) Int. Cl.
*G06K 9/00* (2006.01)

(52) U.S. Cl.
USPC .......................................... 382/104

(58) Field of Classification Search
USPC ................... 382/103, 104; 348/342
See application file for complete search history.

(56) References Cited

U.S. PATENT DOCUMENTS

| | | | |
|---|---|---|---|
| 5,987,174 A | 11/1999 | Nakamura et al. | |
| 6,819,779 B1 * | 11/2004 | Nichani | 382/104 |
| 6,845,172 B2 * | 1/2005 | Furusho | 382/104 |
| 7,369,172 B2 * | 5/2008 | Fujii | 348/342 |
| 2003/0103649 A1 * | 6/2003 | Shimakage | 382/104 |
| 2004/0016870 A1 | 1/2004 | Pawlicki et al. | |
| 2004/0164851 A1 | 8/2004 | Crawshaw | |
| 2005/0152581 A1 * | 7/2005 | Hoki et al. | 382/104 |
| 2005/0265579 A1 * | 12/2005 | Nishida | 382/103 |

FOREIGN PATENT DOCUMENTS

| | | |
|---|---|---|
| EP | 1227438 A2 | 7/2002 |
| JP | 2004145501 A | 5/2004 |

OTHER PUBLICATIONS

Masayoshi Kamijo et al., "Lane Indication/.Recognition System by Using Image Sensors: Evaluation of Indication Performance of Lane Marks in the Real World," TRB Annual Meeting CD-ROM, Jan. 1, 2003, p. 17.

* cited by examiner

*Primary Examiner* — Claire X Wang
(74) *Attorney, Agent, or Firm* — Rothwell, Figg, Ernst & Manbeck, P.C.

(57) ABSTRACT

A method and system for reflection detection in road video images, is provided. One implementation involves detecting road surface reflections, by receiving an image of a road in front of a vehicle from an image capturing device, determining a region of interest in an identified road in the image, and detecting road surface reflections in the region of interest.

14 Claims, 12 Drawing Sheets

Vertical enough => line fit to peak-valley centers

Fit Not vertical enough => not a reflection !

METHOD AND SYSTEM FOR REFLECTION DETECTION IN ROAD VIDEO IMAGES

CROSS-REFERENCE TO RELATED APPLICATIONS

This application is a 35 U.S.C. §371 National Phase Entry Application from PCT/EP2008/000485, filed Jan. 23, 2008, and designates the United States, which claims priority under 35 U.S.C. 119(e) from U.S. Provisional Patent Application Ser. No. 60/897,082, filed Jan. 23, 2007, incorporated herein by reference. This application further claims priority under 35 U.S.C. 19(e) from U.S. Provisional Patent Application Ser. No. 60/897,225, filed Jan. 23, 2007, incorporated herein by reference. This application further claims priority under 35 U.S.C. 119(e) from U.S. Provisional Patent Application Ser. No. 60/897,219, filed Jan. 23, 2007, incorporated herein by reference. This application further claims priority under 35 U.S.C. 119(e) from U.S. Provisional Patent Application Ser. No. 60/897,220, filed Jan. 23, 2007, incorporated herein by reference.

FIELD OF THE INVENTION

The present invention relates to video image processing and in particular to detecting features in video images.

BACKGROUND OF THE INVENTION

In video images, reflections from certain surfaces can confuse image understanding systems. For example, road lane markings, which appear as intermittent or continuous bright stripes in an image of a road, can be confused with from-the-road reflections that have a similar, bright, stripe-like appearance. Existing methods do not address processing images including reflections from road surfaces, and either require multiple video cameras or require highly complex modeling and image processing.

BRIEF SUMMARY OF THE INVENTION

The present invention provides a method and system for reflection detection and suppression in road video images. One embodiment involves detecting road surface reflections, by receiving an image of a road in front of a vehicle from an image capturing device, determining a region of interest in an identified road in the image, and detecting road surface reflections in the region of interest.

Detecting road surface reflections may include determining luminance gradients in the region of interest, and identifying road surface reflections by comparing the luminance gradients to a strength threshold. Further, determining luminance gradients may include determining edge strength in the region of interest to identify potential reflection edges, and identifying road surface reflection may include comparing edge strength to said strength threshold.

Further, identifying road surface reflections may involve identifying a pair of edges as potential reflection edges by comparing each edge strength to said strength threshold, determining spacing between the pair of edges, and comparing said spacing to a spacing threshold, wherein if the edge spacing is greater than the spacing threshold, then the edge pair is eliminated from further consideration, otherwise the edge pair may represent a reflection. Identifying road surface reflections may additionally involve determining lengths of possible reflection edges, comparing each edge lengths against a length threshold, wherein if each edge length is less than the length threshold, then the edge pair is eliminated from further consideration, wherein remaining edges represent reflection edges.

These and other features, aspects and advantages of the present invention will become understood with reference to the following description, appended claims and accompanying figures.

DETAILED DESCRIPTION OF THE INVENTION

Figure 1A:
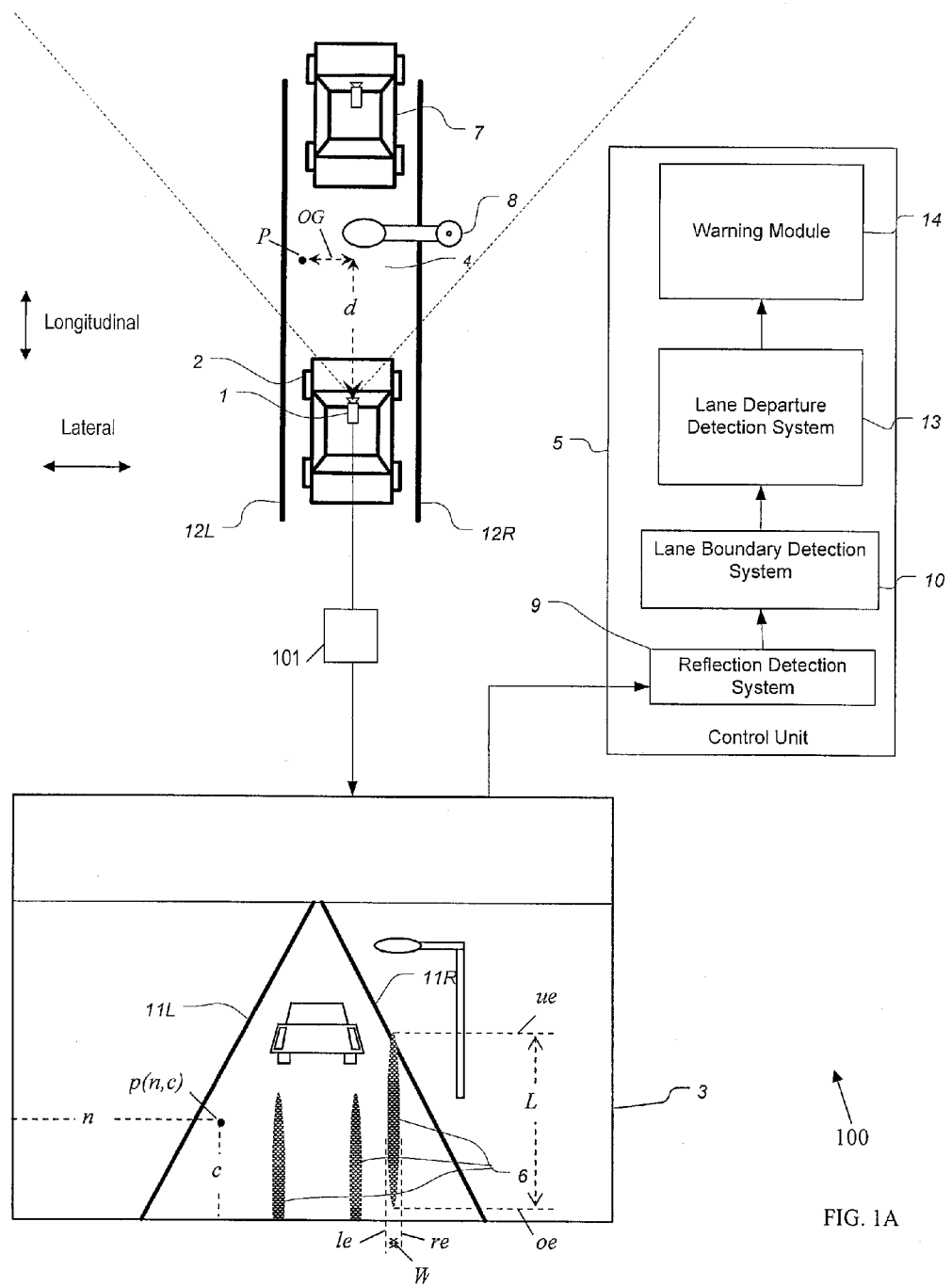
FIG. 1A shows a functional block diagram of a reflection detection system according to an embodiment of the present invention.

The present invention provides a method and system for reflection detection in road video images. One embodiment involves processing road images from a vehicle-mounted video camera to identify and track objects, such as lane markings, vehicles, etc. From-the-road reflections are identified in an image and suppressed (separated out), relative to image features representing objects of interest such as lane markings. For example, reflections are separated from lane markings on a road, thus allowing more accurate road lane detection and tracking.

The reflection detection process involves: Obtaining an image of the road and determining image features in region(s) of interest to analyze; Finding possible reflection edges in the region(s) of interest in the image; Checking spacing between pairs of possible reflection edges against a spacing threshold, and eliminating from consideration too widely spaced edge pairs (i.e., accepting edges not too widely spaced); Optionally assembling remaining edges, located above each other in the image, into possible reflection edges; Checking lengths of possible reflection edges against a length threshold to eliminate from consideration those that are too short (i.e., accepting edges that are not too short); Growing accepted edges outward to e.g. 50% points (of reflection length or gradient value); Selecting the pixels or columns located between the 50% points as reflections.

In one implementation, a single camera is used to capture an image of a road, wherein the image comprises a two-dimensional array (multiple rows, and multiple columns) of pixels (which can be black and white or color). The captured image is compressed column-wise into a reflection column histogram for reflection elimination processing. The column-oriented approach locates and stores where reflections are in the image. In that regard, individual luminance gradients are compared with a single gradient threshold value to determine where reflections might be located in the image (i.e., edge strength is detected in the image). Said threshold value is essentially a luminance difference value between a pixel and its neighbor, such that if the difference is larger than the threshold value (e.g., 18), the pixel represents a potential reflection edge.

The column-wise compression further allows for identification of irregular or imperfect vertical reflections. In addition, image features, such as sun-stripes during daylight operation, may be identified. The column-oriented approach avoids computationally expensive 2-D (two dimensional) pixel oriented image processing.

One example application involves a process of specifically detecting reflections in image areas where road markings are likely to be found. This allows identifying reflections where road markings may be present, with the goal of distinguishing between road markings and reflections. The reflection detection process outputs specific locations of the reflection areas in the image, so that the reflections may be eliminated/suppressed from consideration in identifying road markings, etc.

On-the road reflections in video images generally appear as bright, vertical stripes. The reflection detection process searches for such stripes, using gradients stacked over each other, following their shape outwards, and labeling the columns and/or pixels (locations of image features) that come from reflections. The reflection location information can be used to suppress the reflections from further processing. The reflections may have a minimum length and a maximum width. A brightness search out to e.g. a 50% gradient or length point accounts for irregular reflection edges.

If a color image is available, then the spectral characteristics of the reflections may be exploited to identify object of interest (and suppress from-the-road reflections). For example, a relatively long, red stripe in the image is very likely from the taillights of a vehicle up ahead, which may be an object of interest. The red channel of a color RGB image is analyzed to find such features of interest.

The texture and spectral characteristics of the reflections may provide indications of the road condition ahead. A wet road surface reflects differently than an icy road surface, which is generally more homogenous and bluer than its unfrozen counterpart. Non-homogeneous reflections correspond to an uneven road, with different friction coefficients.

FIG. 1A shows an embodiment of a system architecture 100 according to the invention, shown in conjunction with a vehicle-mounted camera 1 that captures images of a road 4 (top view of the road 4 is shown). A sampler 101 may be used for sampling digitized video input signals to create a two-dimensional image as an array of pixels arranged in rows and columns. The system architecture 100 includes a reflection detector 9 that may provide reflection information to a lane boundary detection system 10, as shown.

The video camera 1 is mounted to the vehicle 2 in a forward pointing direction. The camera 1 captures images 3 of the roadway 4 in front of the vehicle 2 and transmits those images 3 to a control unit 5 for analysis. The control unit 5 includes said reflection system, said lane boundary detection system 10, and optionally a lane departure detection system 13 and a warning module 14. The reflection detector 9 may be component of the lane boundary detection system 10.

Using reflection detection/identification information from the reflection detector 9, the lane boundary detection system 10 detects and tracks the lane boundary marking image features 11L and 11R, representing actual lane boundary markings 12L and 12R on the roadway 4, respectively. Reflections 6 in the image represent roadway reflections. Examples of sources of such reflections 6 include the tail lights of a leading vehicle 7 and street lamps 8. The reflection detector 9 identifies such reflections 6, which aids the lane boundary detection system 10 to correctly detect the positions of the marking images 11L, 11R in the images 3, without confusing interference from the reflection images 6.

Figure 1B:
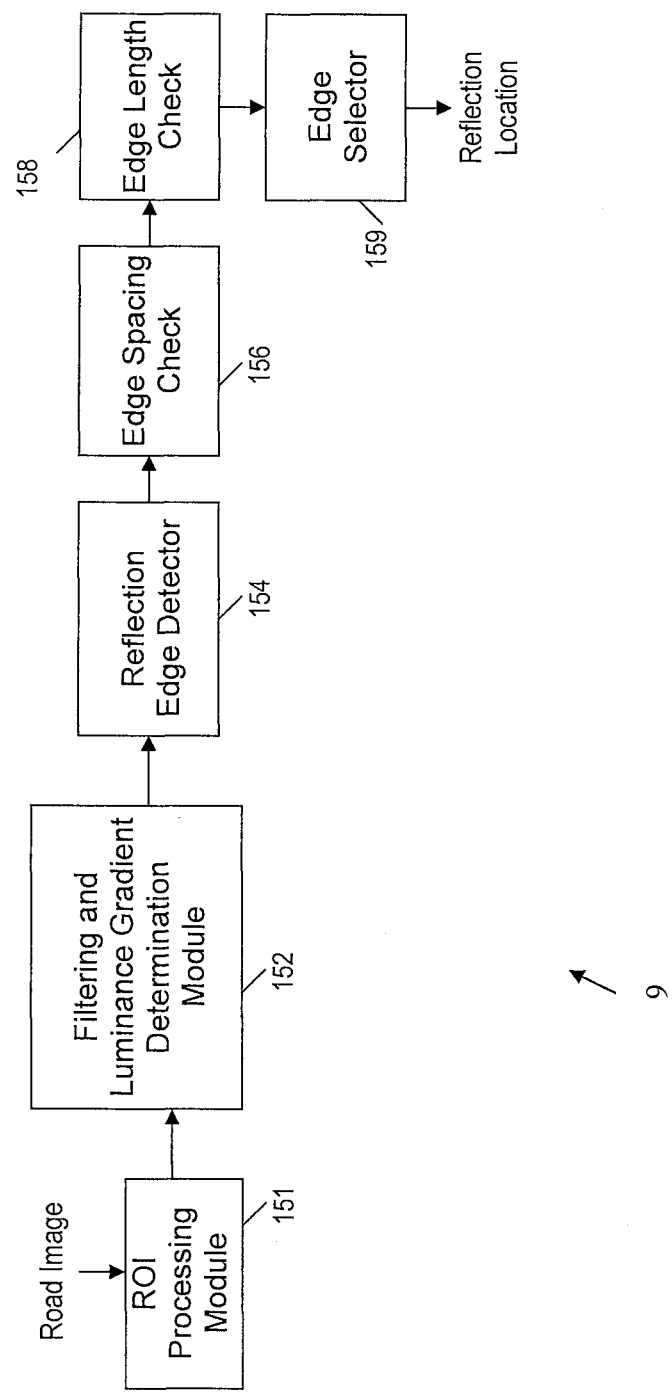
FIG. 1B shows a functional block diagram of an example reflection detection apparatus according to the present invention.

The positions of the marking images, 11L and 11R, in the image 3 are transmitted from the lane boundary detection system 10 to the lane departure detection system 13 which, in turn, drives a warning module 14 to notify the driver that the vehicle 2 may be departing the roadway lane, delimited by the markings 12L and 12R. By detecting reflections 6 via the reflection detector 9, and filtering them from the lane marking images to track, certain false warnings are prevented from reaching the driver. FIG. 1B shows a functional block diagram of an example reflection detector 9 according to the present invention. The reflection detector 9 includes a region of interest (ROI) image processing module 151, a filtering and luminance gradient detection module 152, a reflection edge detector 154, an edge spacing checker 156, an edge length checker 158, and an edge selector 159.

The ROI determination module 151 determines image features in region(s) of interest to analyze. The filtering and luminance gradient detection module 152 determines luminance gradients in the image. The reflection edge detector 152 determines gradient peaks and valleys as possible reflection edges in the region(s) of interest in the image. The edge spacing checker 156 checks spacing between pairs of possible reflection edges against a spacing threshold, and eliminates from consideration too widely spaced edge pairs (i.e., accepting edges not too widely spaced). The edge length checker 158 checking lengths of possible reflection edges against a length threshold to eliminate from consideration those that are too short (i.e., accepting edges that are not too short). The edge selector 159 grows accepted edges outward to e.g. 50% points (of reflection length or gradient value), and selects edge pixels or columns located between the 50% points as reflections. The modules and components shown in FIGS. 1A-1B, can be implemented in many ways, such as program instructions for execution by a processor, as logic circuits, as an application specific integrated circuit, as firmware, as software modules, etc., as those skilled in the art will appreciate.

Two example reflection detection processes according to the present invention are described below, starting with a common determination of relevant parameters in each process.

Common Determination of Relevant Parameters

A moving average filter is used to detect features of certain shapes and dimensions in each camera image, wherein the filter is applied to multiple image rows.

This involves determining the minimum feature size to resolve (e.g., in meters, yards, etc.), and converting the feature size to image pixels for the distance corresponding to each image row. This number of pixels is the length of an equally-weighted, moving average filter used below for processing image pixel rows (described further below).

An example of determining the feature size includes: (i) Determining a minimum length parameter for reflections 6, first in e.g. meters, then converted to length L in pixels (FIG. 1A), at a length centered about a typical distance of interest, such as 10 meters; a physical length of 1.5 meters at night and 2.0 meters for daytime sun-stripe detection has proved useful; and (ii) Determining a maximum width parameter for reflections 6, first in e.g. meters, then converted to width W in pixels (FIG. 1A), at a typical distance of interest, such as 10 meters; a physical width of 1.1 meters at night and 0.2 meters during day has proved useful. Reflections on roads typically observe such size limits.

Said minimum length and maximum width parameters (expressed in pixels) are applied to the reflection column histogram, as thresholds, to test for a minimum length of a reflection and for a maximum width of a reflection. The horizontal axis in such a histogram (e.g., histogram 40 in FIG. 4) corresponds to image columns and thus lateral distances in the image, and the vertical axis in the histogram corresponds to the length of high contrast sets of image pixels that define possible reflection edges.

Minimum Feature Size Calculation Procedure for Moving Average Filter Length

Figure 2:
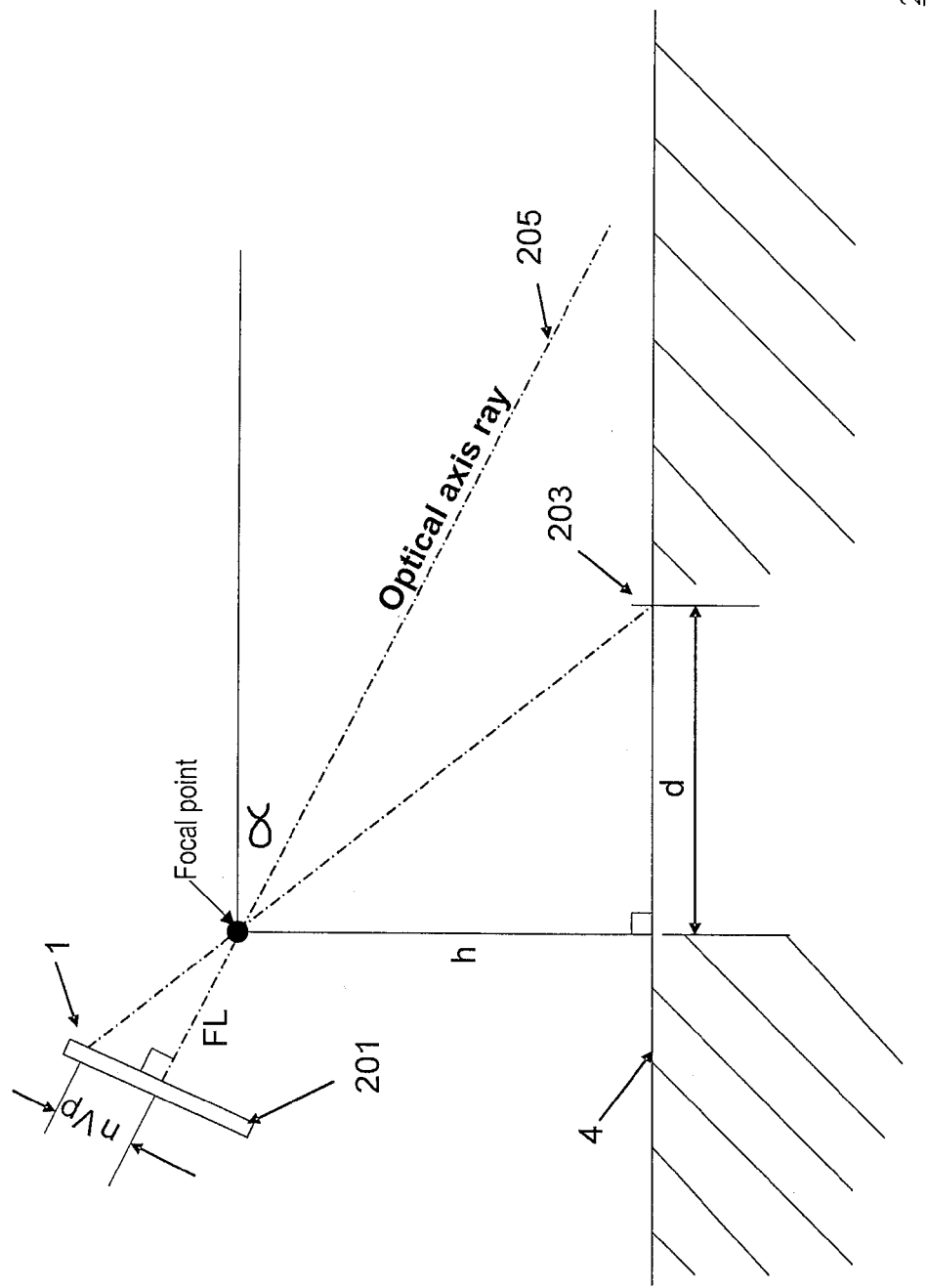
FIG. 2 shows an example side view of camera in relation to the road, illustrating the relationship between the distances in the image plane and the distance ahead on the road.
Figure 3A:
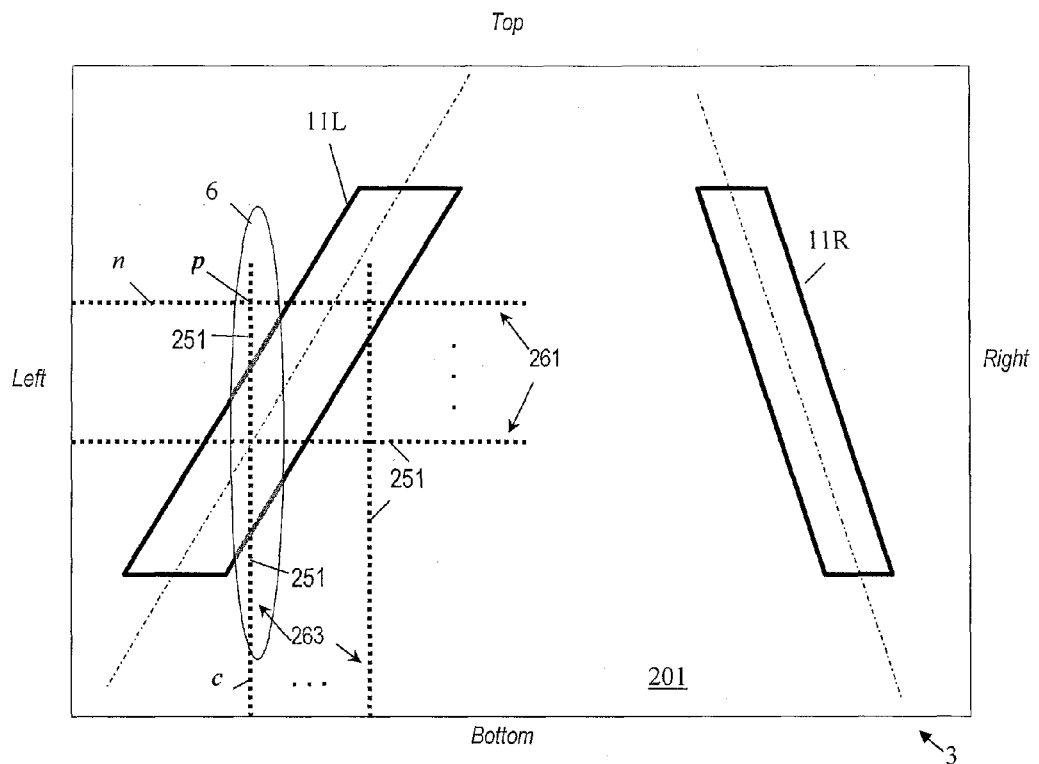
FIG. 3A shows typical image scene with regions of interest covering lane markings.
Figure 3B:
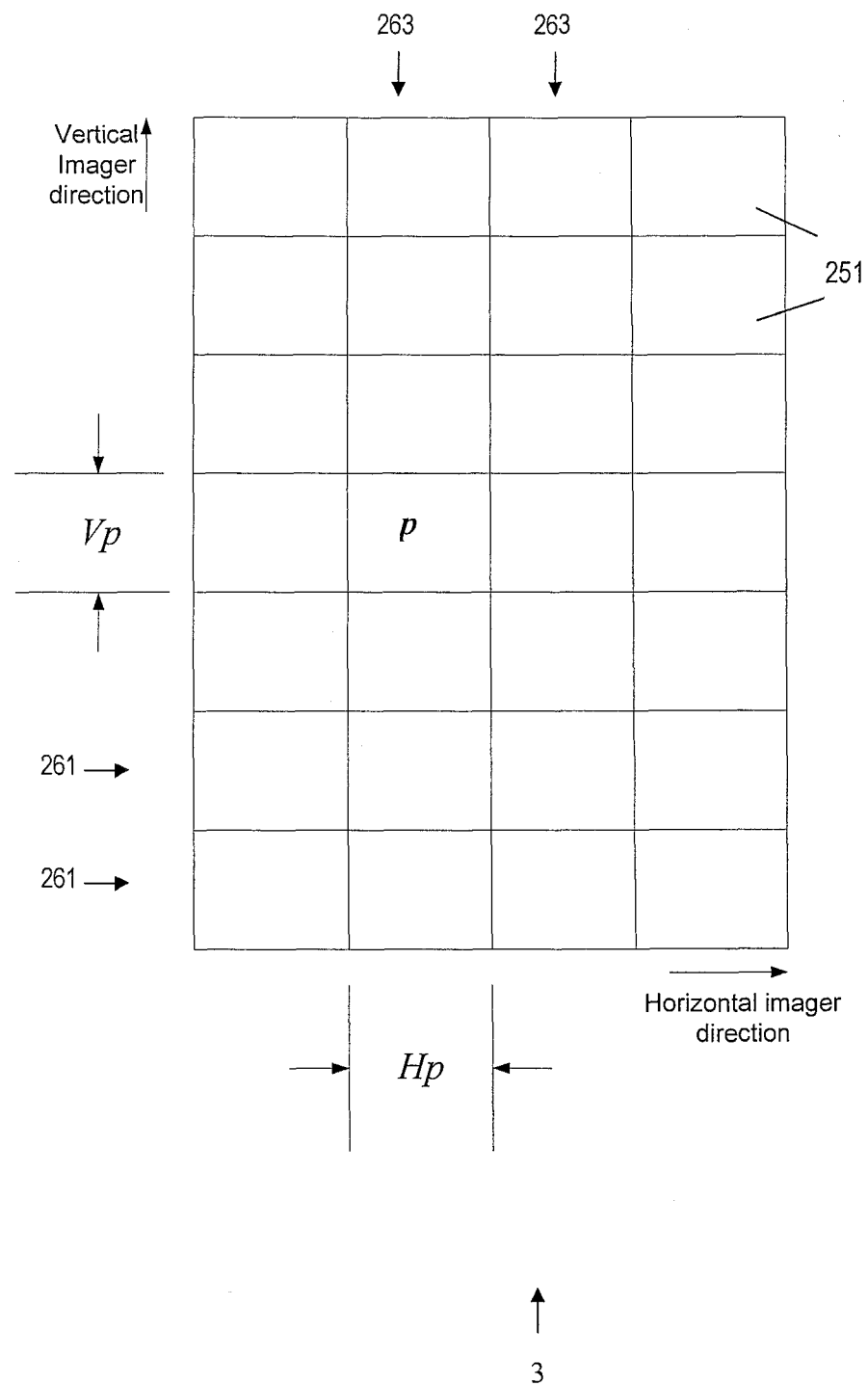
FIG. 3B shows an example of array of image pixels, arranged in rows and columns, illustrating a vertical pixel size Vp and horizontal pixel size Hp, in a road image.

Referring to example 200 in FIG. 2, real-world feature sizes are converted to their equivalents in the image plane 201 by knowledge of the camera focal length FL and height h above the road 4. FIG. 3A shows a reflection 6 in an image plane 201, wherein the image plane comprises as a two-dimensional (2-D) array (multiple rows 261, and multiple columns 263) of pixels 251. An image pixel p (e.g., at row=n, column=c) in image plane 201 geometrically transforms to a corresponding position P on the plane of the road 4 (FIG. 1A), defined by a distance ahead, d, and a lateral offset distance, OG, relative to the camera (as a position (d, OG)). For example, as shown in FIG. 2, an image pixel row n corresponds to physical locations 203 (i.e., a set of road positions P on a line perpendicular to the plane of the drawing) on the road 4. The relationship between row n and physical location 203 at horizontal distance d on the plane of the road 4 can be expressed as:

$$\tan\left(\alpha - \tan^{-1}\left(\frac{h}{d}\right)\right) * \frac{FL}{Vp} = n, \quad (1)$$

wherein α is the camera pitch angle relative to the road, h is the vertical distance between the camera and the road, d is the on-the-road distance ahead to the physical location 203 on the road, Vp is the vertical pixel size on the image plane 201, and FL is the focal length of the camera lens. FIG. 3B shows an example of vertical pixel size Vp and horizontal pixel size Hp.

Image pixel row n (FIG. 3A) is measured relative to the camera optical axis (OA) 205. The closer the row n is to the bottom of the image 3, the smaller is the distance d to the camera 1. The location of pixel column c relative to the left and right side of the image 3 indicates a lateral offset of the camera 1 relative to the markings 12L, 12R.

Furthermore, a length m of pixels of horizontal size Hp per pixel, covers an on-the-road lateral distance OG at an on-the-road distance d ahead, wherein:

$$OG = \frac{\sqrt{h^2+d^2}\,mHp}{\sqrt{FL^2+n^2Vp^2}} = \frac{PDmHp}{\sqrt{FL^2+n^2Vp^2}}, \quad (2)$$

wherein PD represents perspective distance, and m is the number of pixels.

Figure 3C:
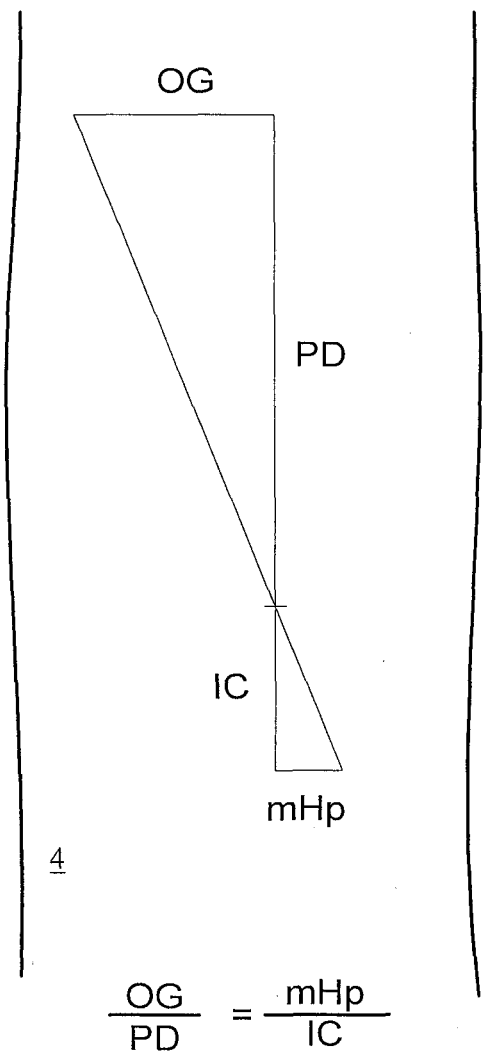
FIG. 3C shows a top road view, illustrating proportionality between on-the-road lateral distance OG and the lateral distance mHp in the image plane.

Therefore, given OG, and the distance ahead d, the value of m, then row n can be calculated as the filter length, for every image row n of interest. A typical OG value is 10 centimeters. FIG. 3C shows that on-the-road lateral distance OG is proportional to the lateral pixel distance mHp in the image plane 201. In FIG. 3C, the in camera (IC) value represents $\sqrt{FL^2+n^2Vp^2}$.

A maximum reflection width is converted to an equivalent number of pixels W (FIG. 1A) at a typical distance ahead d. In one example, a row n corresponding to the typical distance d is first calculated, using relation (1) above. Given this new calculated row n, the number of pixels corresponding to the maximum width W is calculated using relation (2) above. This maximum number of pixels W (representing the spacing between possible reflection edges le, re in FIG. 1A) is used to test the spacing between possible reflection edges, rejecting those pairs of edges that are too widely spaced. OG is measured relative to the line defined by a second plane slicing the road plane. This second plane is defined by the lens focal point and the column containing the optical axis.

First Reflection Detection Process

Figure 4:
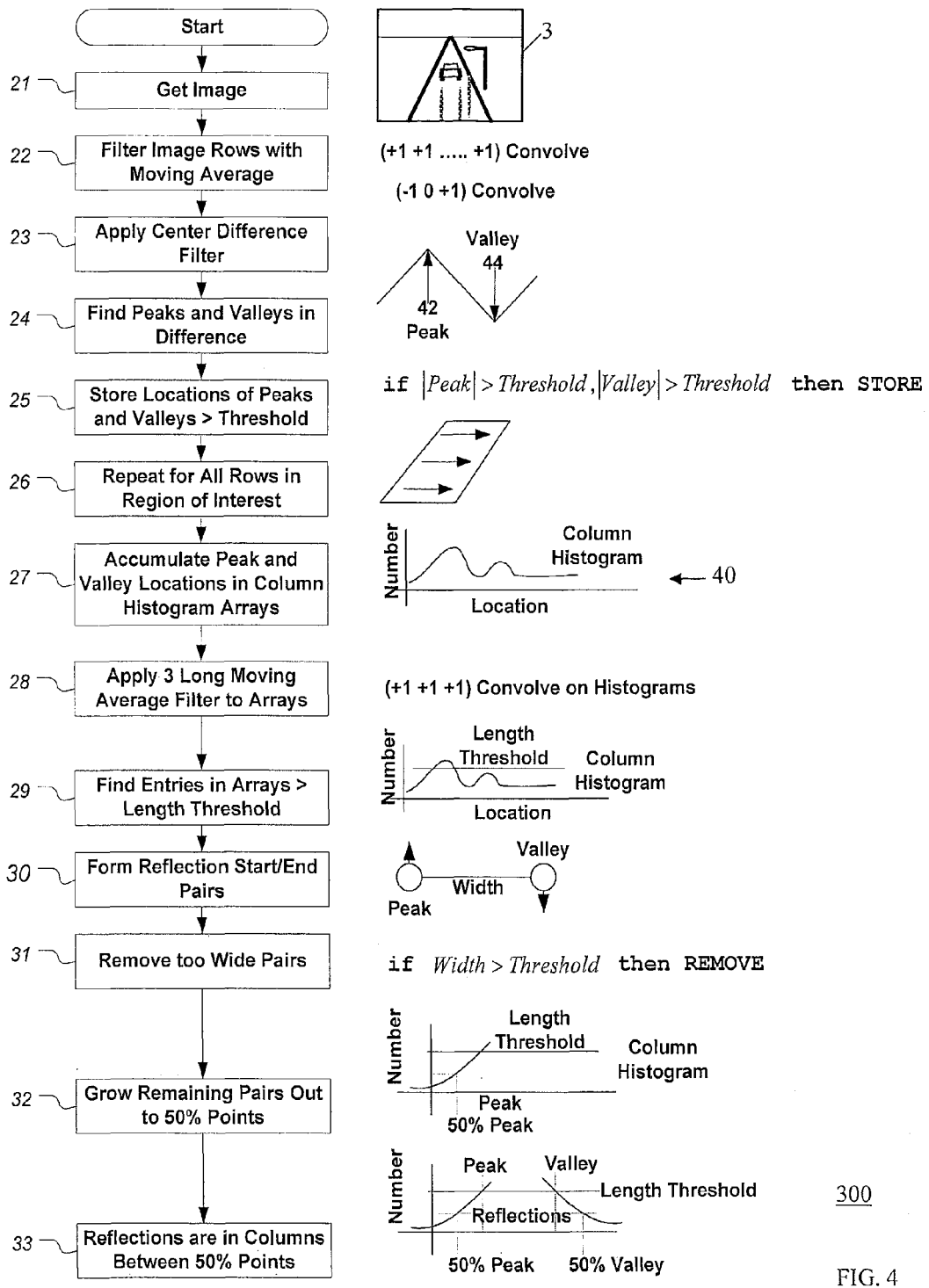
FIG. 4 shows a flowchart of the steps of a process for reflection detection, according to an embodiment of the invention.

Reflections on a road surface appear as vertical stripes, usually of significant length. The edges of the reflections typically have significant gradients. A first example reflection detection process (referenced above), generates a list of image columns c which contain reflections 6 (FIG. 3A). An example detection process 300 is shown in FIG. 4 including the following steps:

Step 21: Obtain a road image 3.

Figure 5:
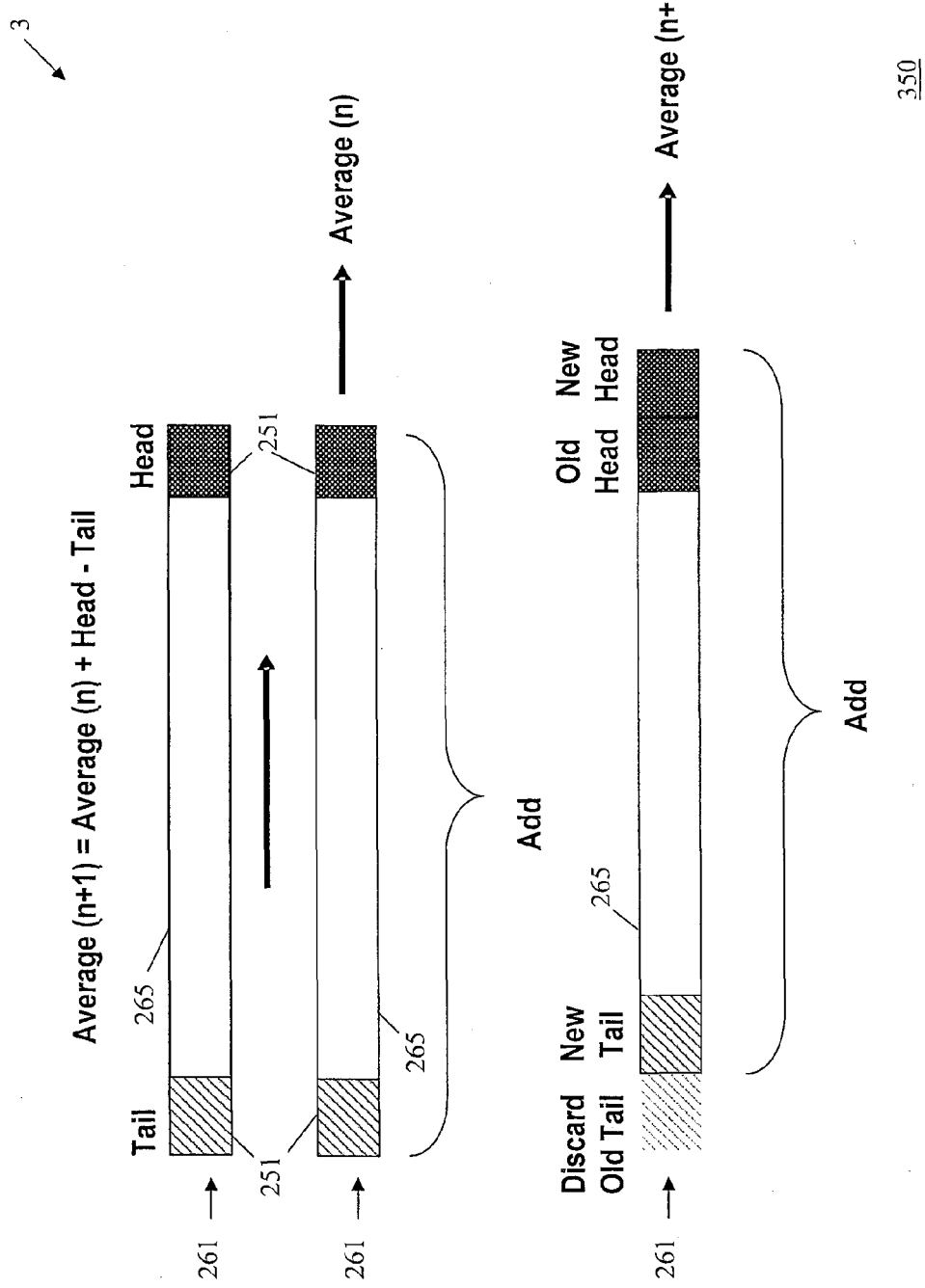
FIG. 5 shows a moving average filtering scheme for rows according to the reflection detection process of FIG. 4.

Step 22: Apply a moving average filter process to the gray levels of the pixels in an image row, such as row n. Specifically, take an image row, and move across row pixels with an equally-weighted, moving average filter, of the length corresponding to the minimum feature size to resolve, forming local averages at each pixel location. FIG. 5 shows an example 350 for a moving average filtering scheme for each row 261 of multiple pixels 251. The length of a pixel row segment 265 varies with the row location in the image 3, with rows representing images of road markings closer to the camera having a longer segment 265 (i.e., a longer filter kernel).

Step 23: Apply a centered-difference filtering process to pixel row local averages from the moving average, to obtain the luminance gradient at each pixel location in the row.

Step 24: Perform searching on the gradients in the row, alternately looking for peaks and valleys in the gradient values (e.g. peak 42, valley 44 in FIG. 4). An image pixel location is determined to be a gradient peak if its luminance gradient value is greater than or equal to a gradient threshold and greater than or equal to the luminance gradient value of the pixel to its immediate right. The gradient threshold can be e.g. 1 to 255 for an 8-bit imager, preferably between 10 and 30. An image pixel location is determined to be a gradient valley if its luminance gradient value is less than or equal to the negative of the gradient threshold, and less than or equal to the luminance gradient value of the pixel to its immediate right. A gradient peak represents an edge (e.g., a high contrast, dark to light edge) in the image 3. Similarly, a gradient valley represents an edge (e.g., a high contrast, light to dark edge) in the image 3.

Step 25: Perform column-wise compression by determining column location of the pixel peak in the gradient value that exceed a first strength threshold (e.g., 1 to 255, and preferably between 10 and 30), and store the column location in a one dimensional (1-D) reflection edge start histogram. As such, a sufficiently strong luminance gradient in column x of a row leads to the value in bin x of the reflection start histogram being incremented by one. The column locations of the valley in the gradient value that are less than a second strength threshold (e.g., 1 to 255, and preferably between 10 and 30) are stored in a 1-D reflection end array, such that a sufficiently strong negative gradient in column y of a row leads to the value in bin y of the reflection edge end histogram being incremented by one.

Step 26: Perform step 25 through all rows of interest, defined by the region of interest, accumulating possible reflection starts and reflection ends in the histograms.

Step 27: Accumulate gradient peak (maximum) and valley (minimum) locations in column histogram arrays. This accumulation corresponds to reflections having gradients located approximately vertically over each other.

Step 28: Perform summing of every set of 3 adjacent bins in the reflection start and end arrays, replacing the original value in the center, thereby reducing irregularities and improving detection.

Step 29: Find all those entries in the reflection start and end histograms exceeding a length threshold (e.g., between 1 and the number of rows in the image, and preferably between 10 and 50 pixels). This operation corresponds to requiring a minimum length for reflections. The histogram value corresponds directly to the approximate length of a reflection edge, the length determined based on histogram pixel value, the approximate on-the-ground length of a pixel, at a typical distance. In one example, a distance of 15 meters ahead of the camera is considered for detecting reflections, and one pixel at that distance covers 0.8 meters on the ground longitudinally. Then, a histogram value of 9 pixels corresponding to an approximates an on the ground reflection length of 7.2 longitudinal meters.

Step 30: Form reflection edge start and edge end pairs based on the reflection start histogram and the reflection end histogram.

Step 31: For each peak-valley reflection edge pairs, determine the spacing (width) between the peak and valley. Remove too widely spaced reflection pairs by checking if the distance between each reflection edge start (peak locations) and reflection edge end (valley locations) in a reflection pair is less than a spacing threshold (e.g., between 1 and the number of image columns, and preferably between 1 and 60 pixels). For example, for FIG. 1A this involves determining the distance between left edge le and right edge re of reflection 6. If the edges are not too widely spaced, then the reflection is less than the maximum width wide and validated as a reflection. Those gradient pairs with too large a distance between the start and end gradients are not reflections.

Step 32: Grow the reflections laterally (e.g., 50% peak, 50% valley) as described, by looking for those locations in the filtered start and end arrays whose magnitude is half the length threshold value or larger. This operation corresponds to allowing the reflection edges to be "jagged", or not perfectly vertical.

Step 33: Label all columns between the laterally outward grown reflection locations as arising from reflections, and ignore any pixels within these columns for further processing, thereby eliminating reflections from consideration in lane detection processing.

Second Reflection Detection Process

The second example reflection detection process according to the present invention (referenced above), generates a list of which pixels 251 (FIG. 3A) which represent reflections 6. The first four steps of the process are same as steps 21-24 above. Thereafter, the process generally involves: Finding locations of peaks and valleys for all pixel rows in a region of interest; Checking spacing W (FIG. 1A) between peak and valley pairs ("peak-valley pairs") in each pixel row against a spacing threshold, retaining (accepting) the properly spaced peak-valley pairs (i.e., spacing less than the spacing threshold); Performing connected gradient pairs analysis for the retained peak-valley pairs, labeling, joining and splitting labels if needed, forming groups; Finding highest and lowest pixel rows belonging to each label (group of peak-valley pairs); Using the highest/lowest row information for each label, determining the length L (FIG. 1A) of the grouped peak-valley pair, comparing that length L to a length threshold, and removing from consideration those labeled groups that are not long enough; For the remaining groups, finding the center pixels of each its constituent peak-valley pairs in the image plane (i.e., gradient center location); Least-squares fitting a line to all the gradient center locations (given as (row, column) pairs) for each label; Removing all peak-valley pairs that contributed to a line fit slope of magnitude less than a slope threshold (i.e., too far off vertical to be a reflection); Growing remaining peak-valley pairs outward to their e.g. 50% gradient locations; selecting the 50% gradient locations as bracketing (defining edges of) road surface reflection pixels. Using the 50% gradient accounts raggedness in the reflection edges.

A rationale for outwardly growing the peak-valley pairs is now described. The system detects reflections by searching for high contrast edges positioned essentially vertically over one another in the image. Actual reflections do not exhibit perfectly vertical or even lined up edges, and so the outwardly growing process allows for some raggedness and irregularity in edges. The first detection process above detected strong edges overlapping each other in the image, which may correspond to a reflection. The number of overlapping pixels may be e.g. 20 pixels for such strong edges, more than e.g. 15 pixels required for a reflection minimum length. To account for raggedness and not purely vertical edges, the detection moves outwardly to a point where only 50% of the 20 or 10 pixels are still over each other. This may only be a few image columns, but it provides a margin to ensure that the entire reflection is considered.

In the second detection process here, reflections are still considered as having significant gradients at their edges, but the gradient pairs are treated more individually than the collective approach (i.e., than by finding all the image columns with strong edges over each other) of the first process. Once the gradient pairs have been accepted as coming from a reflection, each pair individually is moved outwardly to those points where only half the original gradient value is present. For example, when a gradient pair accepted as coming from a reflection, with a gradient of 34 on the left edge and 22 on the right, then the gradients are moved leftward until a gradient value of 17 or less is reached for the left edge, and moved rightward until a gradient value of 11 or less is reached for the right edge. Again, this may only be a few image columns, but it provides a margin to ensure that the entire reflection is considered.

Figure 6:
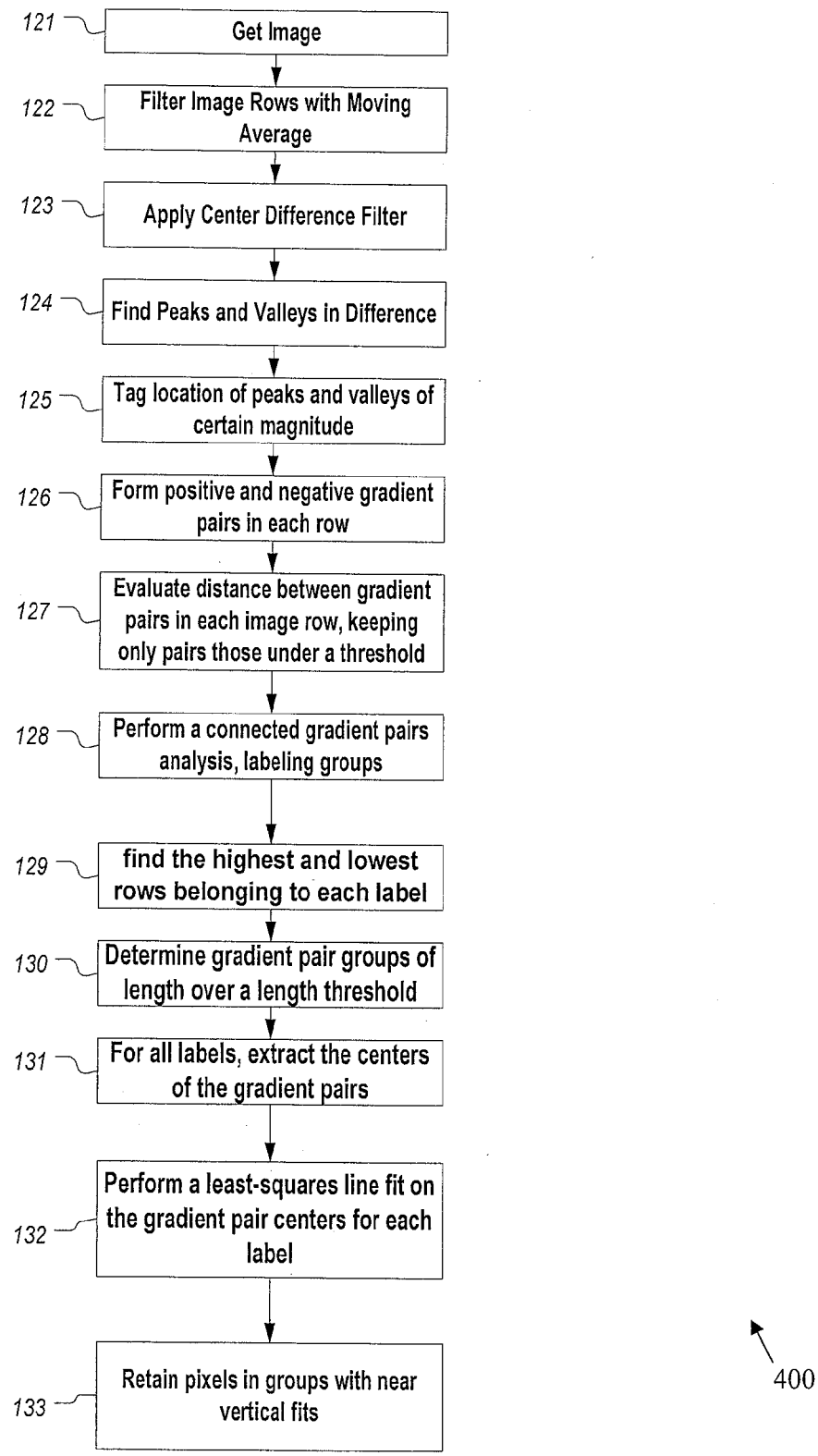
FIG. 6 shows a flowchart of the steps of another process reflection detection, according to an embodiment of the invention.

FIG. 6 shows a flowchart of a reflection detection process 400 for producing a list of which pixels contain reflections as described above, including the following steps:

Step 121: Obtain a road image 3.

Step 122: Apply a moving average filter process to an image row, such as pixel row n. Specifically, take an image row, and move across row pixels with an equally-weighted, moving average filter, of the length corresponding to the minimum feature size to resolve, form local averages at each pixel location.

Step 123: Apply a center-difference filtering process to row local averages from the moving average, to obtain the luminance gradient at each pixel location in the row.

Step 124: Perform searching on the gradients in the row, alternately looking for peaks and valleys in the gradient values. A location is determined to be a luminance gradient peak if its value is greater than or equal to a gradient threshold and greater than or equal to the luminance gradient value to its immediate right. A location is determined to be a luminance gradient valley if its value is less than or equal to the negative of the gradient threshold and less than or equal to the luminance gradient value to its immediate right.

Step 125: The locations of those peaks and valleys whose magnitude exceeds a strength (intensity) threshold are tagged in each row, producing a binary matrix corresponding to the large gradient magnitude locations.

Step 126: Knowing that the left side of a reflection corresponds to a positive gradient, and the right side of a reflection corresponds to a negative gradient, form positive and negative gradient pairs in each image row.

Step 127: Evaluate the distance (spacing) W between the positive-negative gradient pairs in each image row (e.g., left edge le and right edge re, FIG. 1), keeping only those under a width threshold, thus limiting reflections to a maximum width threshold. Those gradient pairs that do not satisfy the maximum width constraint are eliminated from consideration. It is possible, but unlikely, that two peaks or valleys come after one another in sequence in a single row. When a peak (P) is found, the process moves across the row to the right until the nearest valley (V) is found. If the width is acceptable, the locations are grown outward to those points where the gradient reaches 50% of its original peak or valley value. The points are marked, and the peak detection process moves to the next location after the right edge (that is, peak detection skips over a known reflection). If the width is not acceptable, the process moves to a location to the right of its current location and repeats. Thus, for a P-P-V sequence, the process first checks the outermost P and valley V locations, and if too far apart, then checks the center P and the rightmost V, presumably finding them near enough to be from a reflection (it is not possible to use the outer valley of a P-V-V sequence for forming a peak-valley pair, as the leftmost valley will always be accepted before the rightmost one).

Figure 7:
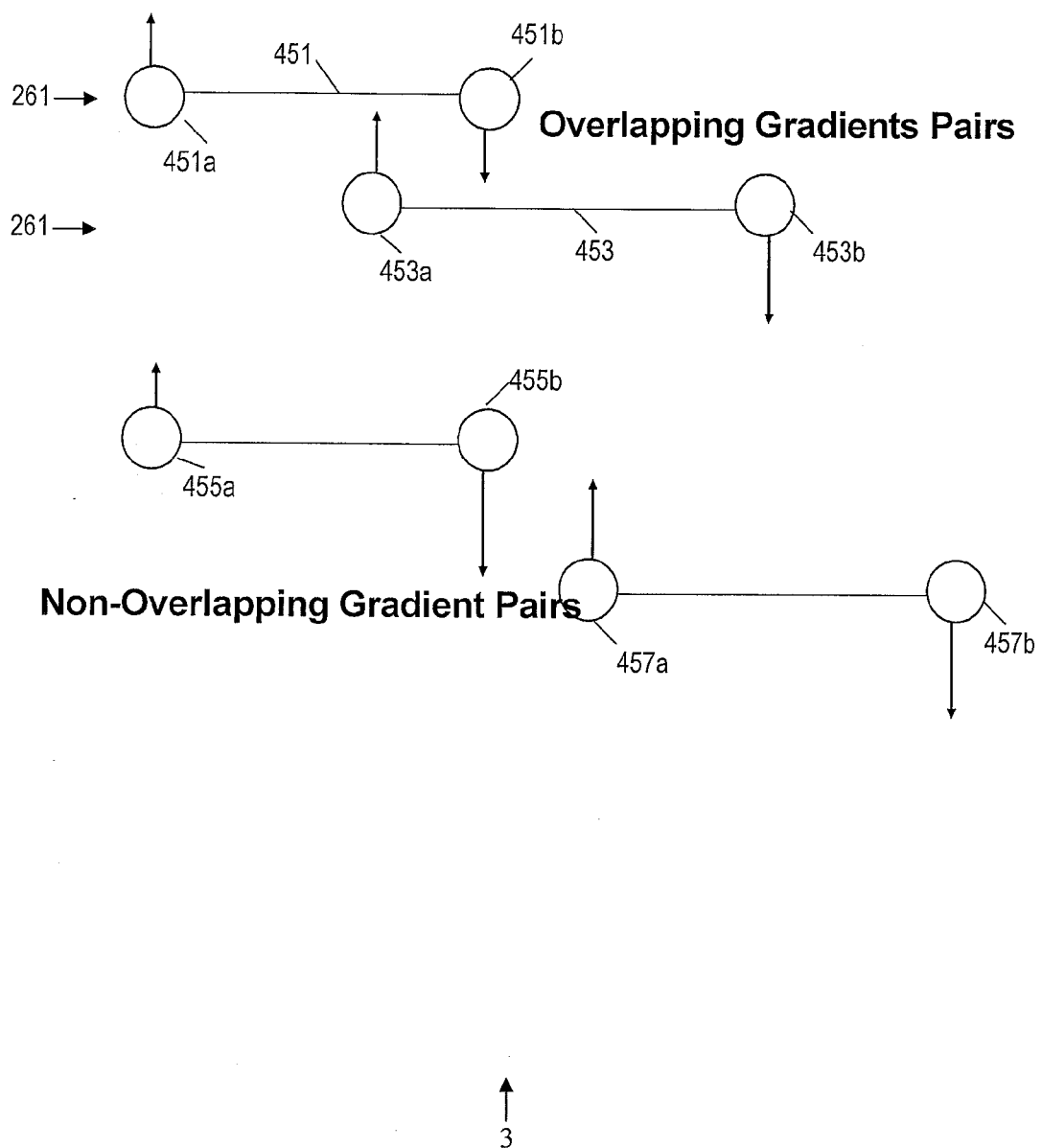
FIG. 7 show examples overlapping and non-overlapping gradient pairs in the road image.

Step 128: Perform a connected gradient pairs analysis, proceeding downward in the image to determine overlapping gradient pairs and non-overlapping gradient pairs. FIG. 7 shows example gradient pairs 451a, 451b and 453a, 453b, which are overlapping. FIG. 7 also shown gradient pairs 455a, 455b, and 457a, 457b, which are non-overlapping. In FIG. 7, 451a is a positive gradient and 451b is a negative gradient, forming a gradient pair. Likewise, 453a, 455a and 457 are positive gradients, whereas 453b, 455b and 457b are negative gradients. If two segments (e.g., 451, 453), over each other overlap at all, join them together with the same label and continue downward until no further overlapping gradient pair is found. The overlap is taken between rows directly over each other (adjacent each other), as shown in FIG. 7. Perform a connected gradient pairs analysis for all gradient pairs that were found, labeling all overlapping gradient pairs with the same label. Note that two reflections can merge into one and are then given the same label. Reflections can also split, moving downward, and are then also given the same label.

Figure 8:
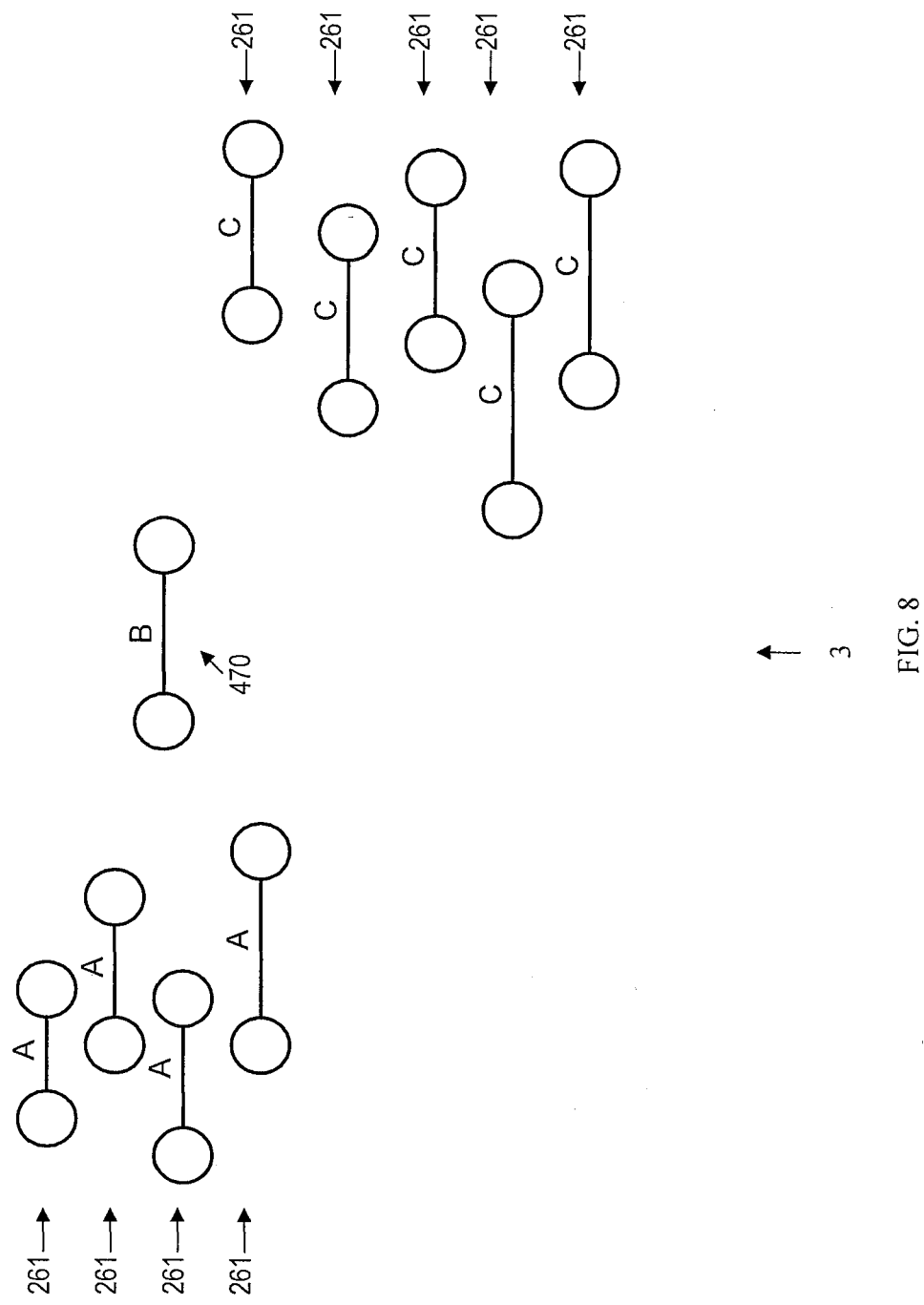
FIG. 8 shows examples of gradient pair groups in the road image.

Step 129: Proceeding through all labels, find the highest and lowest rows belonging to each label. FIG. 8 shows examples of group labels, A, B, C, corresponding to groups of gradient pairs 470 of different lengths. Three labeled groups of overlapping gradient pairs 477 are shown, wherein group A is four rows 261 high, group B is only one row high, and group C is 5 rows high.

Step 130: Determine the gradient pair groups (labeled potential reflections) of length L (FIG. 1A) over a length threshold. If the distance between the highest row(s) (e.g., upper edge ue) and lowest row(s) (e.g., lower edge oe) for a given label is not long enough, remove all gradient pairs related to this label. Labels not having this minimum length are not reflections. If a label includes two reflections that merge or split, evaluate the maximum difference between the upper edges ue and the lower edges oe (FIG. 1A) and compare this with the length threshold.

Step 131: For all labels, extract the centers of the gradient pairs, producing a gradient pair centers list for each label, containing the row and column locations of the gradient pair centers. If a reflection contains splits or merges, take the centers of each gradient pair in rows with multiples (thus one may have a row with two or more gradient pair centers in it).

Figure 9:
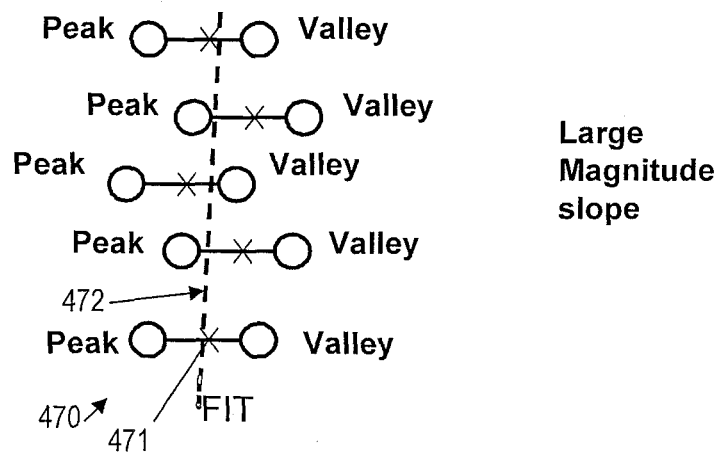
FIG. 9 shows examples of vertical-enough fit line, leading to gradient pairs being retained as reflection edges, and a not vertical-enough fit line, which cannot be a reflections, according to the present invention.
Figure 9:
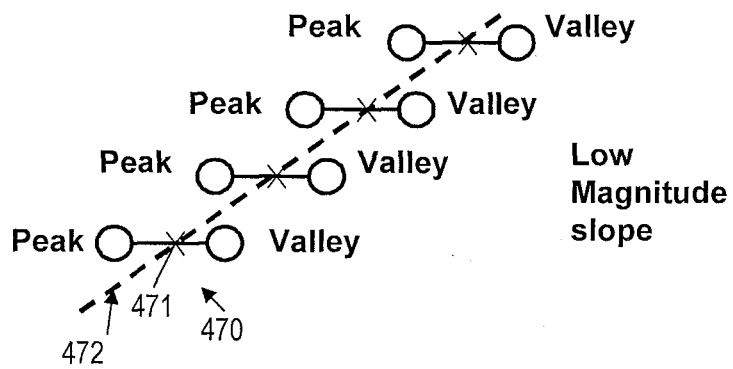

Step 132: Perform a least-squares line fit on the gradient pair centers 471 (marked as x) of gradient pairs 477 for each group label, calculating the slope of a fit line 472 for the gradient pairs (FIG. 9).

Step 133: Knowing that reflections are approximately vertical in the image, eliminate from consideration those labels for which slope of line 472 is lower than a slope threshold (low magnitude slope, or not-vertical enough). Slope of line 472 must be close to vertical (vertical-enough e.g. slope magnitude of greater then 10 to 1) in the image to represent a reflection edge (hence a large slope magnitude represents a reflection). Thereby, identifying all peak-valley pairs that contributed to a line fit slope of magnitude above the slope threshold, indicating the line fit is near vertical. All remaining pixels that have received a label are due to reflections (represent reflection edges).

An additional refinement is to sum the actual length of each pixel with a high gradient into the bin corresponding to the column location of that pixel (this instead of simply incrementing the bin value by 1). This refinement then allows determining the actual length of a reflection, instead of using e.g. the average longitudinal pixel footprint at a 10 meter distance value. The scheme for incrementing the histogram by one, described above, requires longer reflections at greater distances from the camera, since pixels cover more on the road distance at greater distance from the camera.

Yet another refinement involves using the top row location of reflections, which generally come in pairs when associated with vehicles, to measure the distance to a vehicle ahead. The greater the distance to the vehicle, generally, the higher in the image is the top row of the taillight reflection. The spacing between the reflections, together with the paired top row information, gives a more accurate distance measure than the spacing alone (which assumes a default distance between the vehicle lights).

Another refinement involves detecting red reflections particularly, since such reflections very likely originate from the taillights of a vehicle ahead. We deduce from red reflections moving in pairs that there is a vehicle ahead. Further, reflection detection can be performed in color images, since only luminance information is needed. The luminance image may be calculated by standard means from the color image and the methods described herein then applied to find reflections.

Finding bright vertical stripes in the image as representing reflection can be used to identify sun-stripes in video images, which are similar, bright, vertical, imager artifacts. Such artifacts can be caused by the sun being at a certain angle relative to the lens. The thresholds for sun-stripe detection are different from those used for on-the-road reflection detection. This is not a problem however, as sun stripes and on-the-road reflections generally do not occur simultaneously (reflections generally occur during nighttime and sun stripes during daytime).

As is known to those skilled in the art, the example architectures and processes described above, according to the present invention, can be implemented in many ways, such as program instructions for execution by a processor, as logic circuits, software modules, hardware modules, as an application specific integrated circuit, as firmware, etc. The present invention has been described in considerable detail with reference to certain preferred versions thereof; however, other versions are possible. Therefore, the spirit and scope of the appended claims should not be limited to the description of the preferred versions contained herein.

What is claimed is:

1. A method of detecting road surface reflections, comprising the steps of
   receiving an image of a road in front of a vehicle from an image capturing device;
   determining a region of interest in an identified road in the image using a region of interest processing module;
   identifying road surface reflections in the region of interest using a reflection detection device, wherein the identified road surface reflections are not lane markings;
   determining luminance gradients in the region of interest, wherein determining luminance gradients includes determining edge strength in the region of interest to identify potential reflection edges;
   wherein identifying road surface reflections includes
      comparing the luminance gradients to a strength threshold and comparing edge strength to said strength threshold;
      identifying a pair of edges as potential reflection edges by comparing each edge strength to said strength threshold;
      determining spacing between the pair of edges;
      comparing said spacing to a spacing threshold, wherein if the edge spacing is greater than the spacing threshold, then the edge pair is eliminated from further consideration, otherwise the edge pair may represent a reflection;
      determining lengths of possible reflection edges; and
      comparing each edge length against a length threshold, wherein if each edge length is less than the length threshold, then the edge pair is eliminated from further consideration;
      wherein remaining edges represent reflection.

2. The method of claim 1 wherein:
   the image comprises a two-dimensional array of pixels arranged in rows and columns; and
   detecting road surface reflections further includes:
      determining peaks and valleys in luminance gradients of image pixels, wherein a gradient peak represents an edge in the image, and a gradient valley represents an edge in the image;
      determining column location of each pixel luminance gradient peak, and storing the column location in a one dimensional (1-D) reflection edge start histogram; and
      determining column location of each pixel luminance gradient valley, and storing the column location in a one dimensional (1-D) reflection edge end histogram.

3. The method of claim 2 further including determining edge entries in the histograms exceeding a length threshold to eliminate from consideration those edges that are too short to represent reflections.

4. The method of claim 3 further including:
   forming reflection edge start and end edge pairs based on the entries in the start and end histograms, respectively; and
   determining spacing between edges in each pair, comparing the spacing to a spacing threshold and eliminating too widely spaced edges as not being reflections;
   wherein the remaining edges represent reflection pixels.

5. The method of claim 1 wherein:
   the image comprises a two-dimensional array of pixels arranged in rows and columns; and
   detecting road surface reflections includes:
      determining peaks and valleys in luminance gradients of image pixels, wherein a gradient peak represents an edge in the image, and a gradient valley represents an edge in the image;
      comparing spacing between a peak and valley pair in each pixel row against a spacing threshold, wherein if the spacing is greater than the spacing threshold, then eliminating that peak and valley pair from further consideration;
      comparing peak and valley pair lengths against a length threshold, wherein if peak and valley pair lengths are greater than the length threshold, then eliminating that peak and valley pair from further consideration;
      for a group of remaining peak and valley pairs, determining center pixel of each peak-valley pair as gradient center locations;
      performing least-squares fitting of a line to the gradient center locations; and
   identifying all peak-valley pairs that contributed to a line fit slope of magnitude above a slope threshold, as reflection pixels.

6. The method of claim 1 wherein detecting road surface reflections in the region of interest further includes using spectral characteristics of the reflections in a color image of the road to identify road surface reflections.

7. The method of claim 6 wherein the color image comprises an RGB image wherein a red channel of the color RGB image is analyzed for features of interest.

8. An apparatus for detecting road surface reflections, comprising:

an image processing module configured to receive an image of a road in front of a vehicle from an image capturing device, and determining a region of interest in an identified road in the image;

a reflection detection module configured to identify road surface reflections in the region of interest, wherein the identified road surface reflections are not lane markings;

a gradient determination module configured to determine luminance gradients in the region of interest;

wherein the reflection detection module is further configured to identify road surface reflections by comparing the luminance gradients to a strength threshold;

wherein the gradient determination module is further configured to determine edge strength in the region of interest to identify potential reflection edges, wherein the reflection detection module is further configured to compare edge strength to said strength threshold;

wherein the reflection detection module is further configured to identify a pair of edges as potential reflection edges by comparing each edge strength to said strength threshold;

a spacing check module configured to determine spacing between the pair of edges and comparing said spacing to a spacing threshold, wherein if the edge spacing is greater than the spacing threshold, then the edge pair is eliminated from further consideration, otherwise the edge pair may represent a reflection; and a reflection length check module configured to determine lengths of possible reflection edges, and comparing each edge length against a length threshold, wherein if each edge length is less than the length threshold, then the edge pair is eliminated from further consideration, wherein remaining edges represent reflection edges.

9. The apparatus of claim 8 wherein:

the image comprises a two-dimensional array of pixels arranged in rows and columns; and the apparatus further comprising a gradient determination module configured to determine peaks and valleys in luminance gradients of image pixels, wherein a gradient peak represents an edge in the image, and a gradient valley represents an edge in the image;

the reflection detection module is further configured to determine column location of each pixel luminance gradient peak, and store the column location in a one dimensional (1-D) reflection edge start histogram; and determine column location of each pixel luminance gradient valley, and store the column location in a one dimensional (1-D) reflection edge end histogram.

10. The apparatus of claim 9 further comprising an edge length check module configured to determine edge entries in the histograms exceeding a length threshold to eliminate from consideration those edges that are too short to represent reflections.

11. The apparatus of claim 10 further comprising an edge spacing check module configured to:

form reflection edge start and end edge pairs based on the entries in the start and end histograms, respectively; and determine spacing between edges in each pair, compare the spacing to a spacing threshold and eliminate too widely spaced edges as not being reflections;

wherein the remaining edges represent reflection pixels.

12. The apparatus of claim 8 wherein:

the image comprises a two-dimensional array of pixels arranged in rows and columns; and the apparatus further includes:

a gradient determination module configured to determine pixel gradients in the image, and determine peaks and valleys in luminance gradients of image pixels, wherein a gradient peak represents an edge in the image, and a gradient valley represents an edge in the image;

a spacing check module configured to compare spacing between a peak and valley pair in each pixel row against a spacing threshold, wherein if the spacing is greater than the spacing threshold, then eliminating that peak and valley pair from further consideration;

a length check module configured to compare peak and valley pair lengths against a length threshold, wherein if peak and valley pair lengths are greater than the length threshold, then eliminating that peak and valley pair from further consideration;

wherein the reflection detection module is further configured such that for a group of remaining peak and valley pairs, the reflection detection module determines center pixel of each peak-valley pair as gradient center locations, performs least-squares fitting of a line to the gradient center locations, and selects all peak-valley pairs that contributed to a line fit slope of magnitude above a slope threshold, as reflection pixels.

13. The apparatus of claim 8 wherein the reflection detection module is further configured to use spectral characteristics of the reflections in a color image of the road to identify road surface reflections.

14. A system for detecting road surface reflections, comprising:

an image processing module configured to receive an image of a road in front of a vehicle from an image capturing device, and determine a region of interest in an identified road in the image;

a reflection detection module configured to identify, and suppress, road surface reflections in the region of interest, wherein the identified road surface reflections are not lane markings;

a road boundary detector to detect road boundaries from the region of interest;

a lane departure detector to detect vehicle proximity to the detected road boundaries;

a gradient determination module configured to determine luminance gradients in the region of interest;

wherein the reflection detection module is further configured to identify road surface reflections by comparing the luminance gradients to a strength threshold;

wherein the gradient determination module is further configured to determine edge strength in the region of interest to identify potential reflection edges;

wherein the reflection detection module is further configured to compare edge strength to said strength threshold;

wherein the reflection detection module is further configured to identify a pair of edges as potential reflection edges by comparing each edge strength to said strength threshold;

a spacing check module configured to determine spacing between the pair of edges and comparing said spacing to a spacing threshold, wherein if the edge spacing is greater than the spacing threshold, then the edge pair is eliminated from further consideration, otherwise the edge pair may represent a reflection; and a reflection length check module configured to determine lengths of possible reflection edges, and compare each edge length against a length threshold, wherein if each edge length is less than the length threshold, then the edge pair is eliminated from further consideration, wherein remaining edges represent reflection edges.

\* \* \* \* \*